Figure 1:
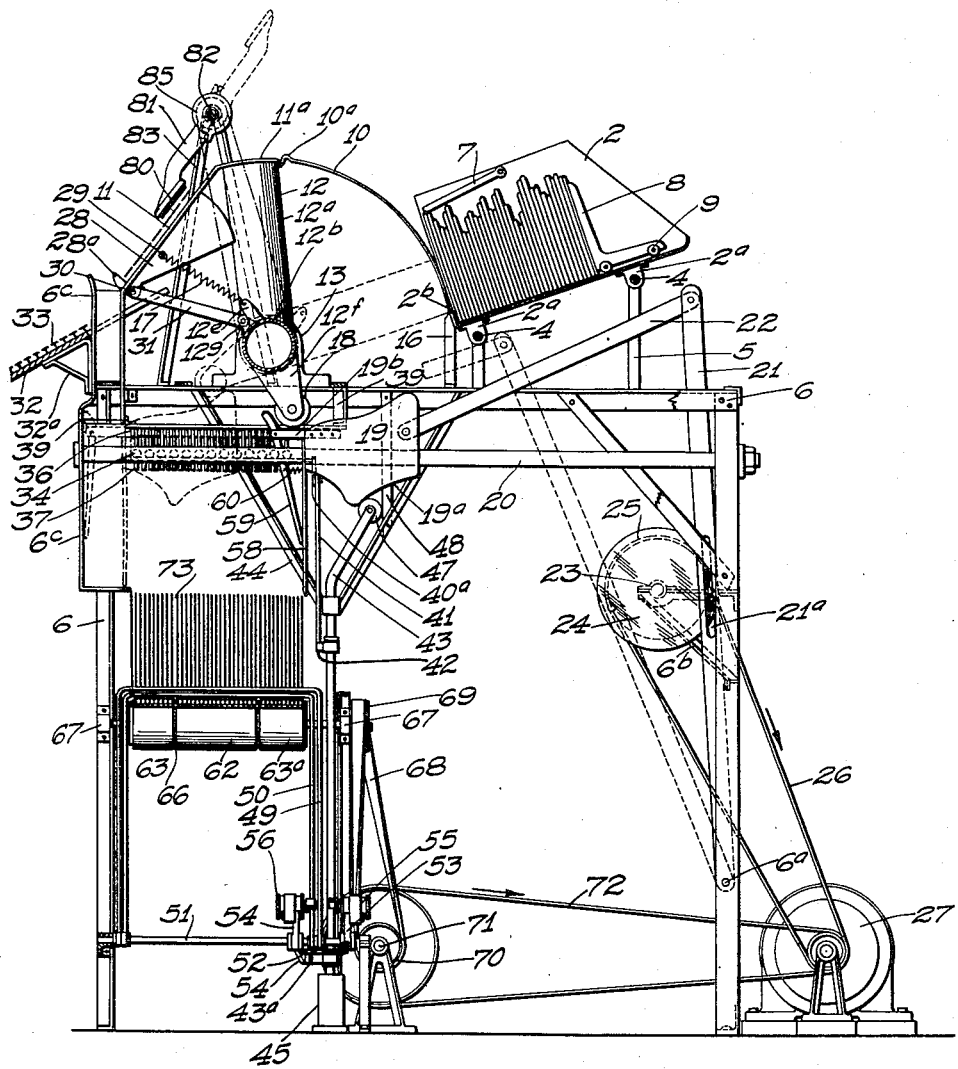

Jan. 1, 1924. 1,479,321
M. S. RUNSVOLD ET AL
MAIL CANCELING, SORTING, AND DISTRIBUTING MACHINE
Filed April 5, 1922 6 Sheets-Sheet 1

INVENTOR.
MARTIN S. RUNSVOLD.
HARRISON G. SLOANE.
BY
A. B. Bowman
ATTORNEY

Jan. 1, 1924

M. S. RUNSVOLD ET AL 1,479,321

MAIL CANCELING, SORTING, AND DISTRIBUTING MACHINE

Filed April 5, 1922    6 Sheets-Sheet 3

INVENTOR.
MARTIN S. RUNSVOLD.
HARRISON G. SLOANE.
BY A. B. Bowman
ATTORNEY

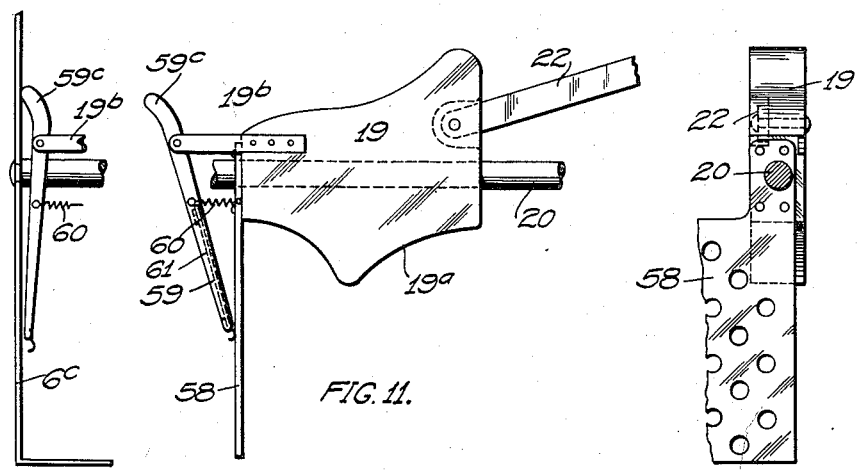
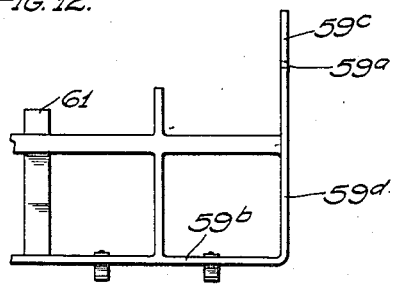
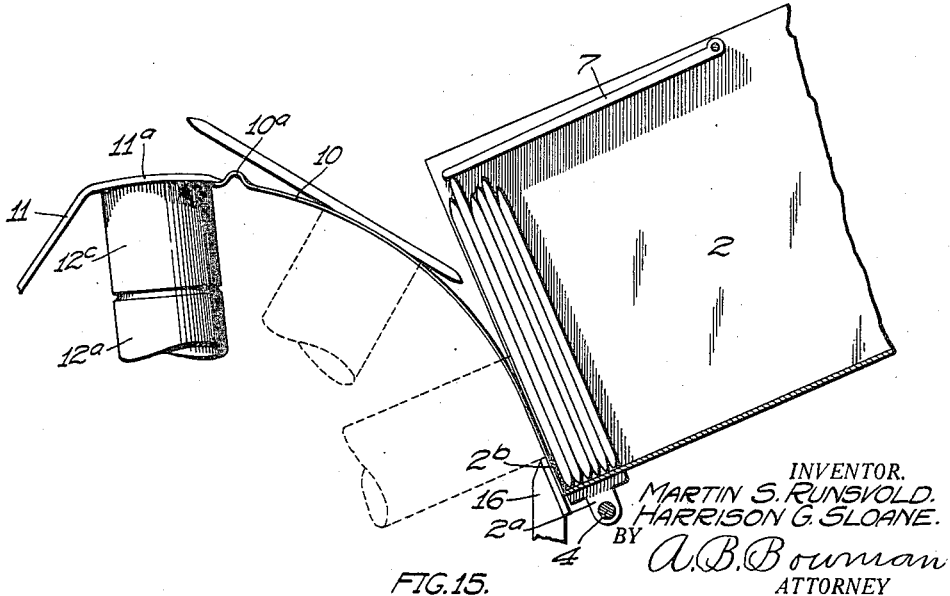

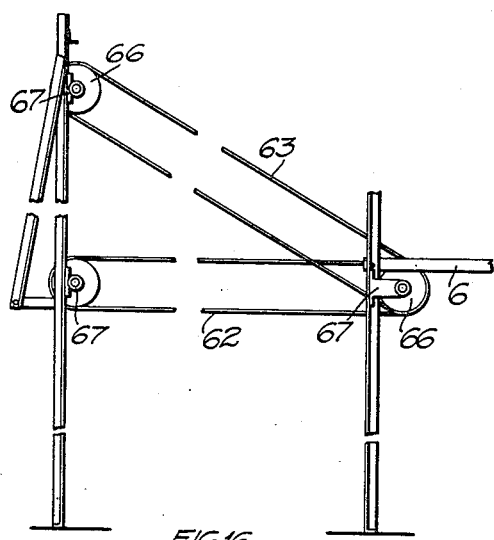
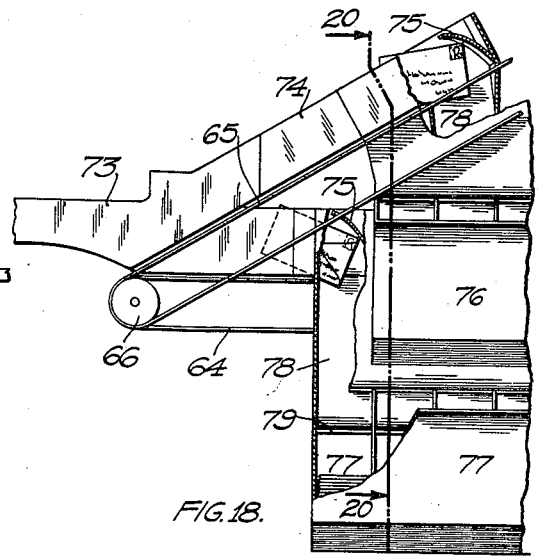
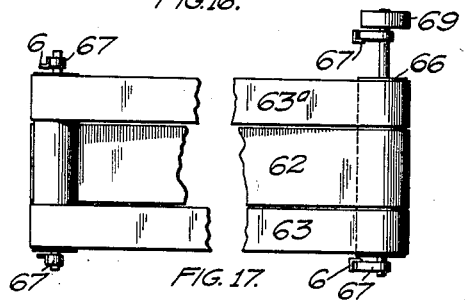
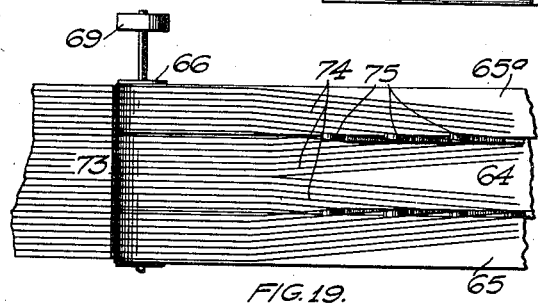
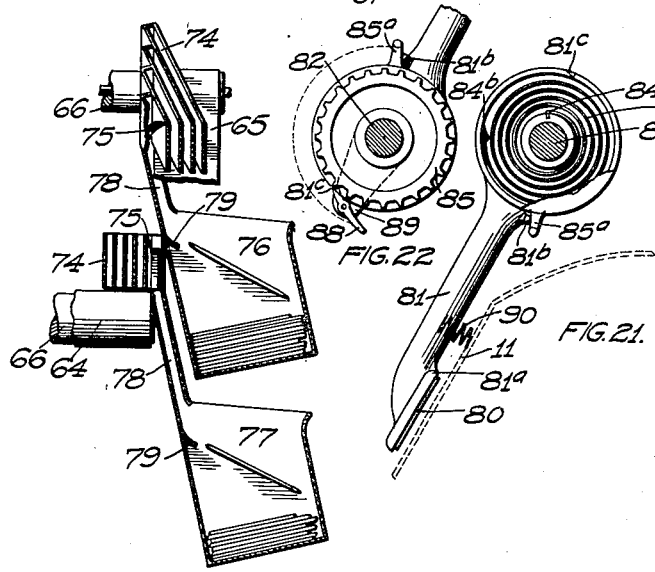
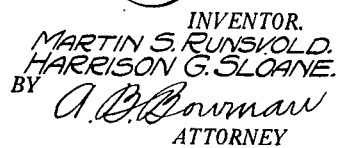

Jan. 1, 1924 1,479,321
M. S. RUNSVOLD ET AL
MAIL CANCELING, SORTING, AND DISTRIBUTING MACHINE
Filed April 5, 1922   6 Sheets-Sheet 6
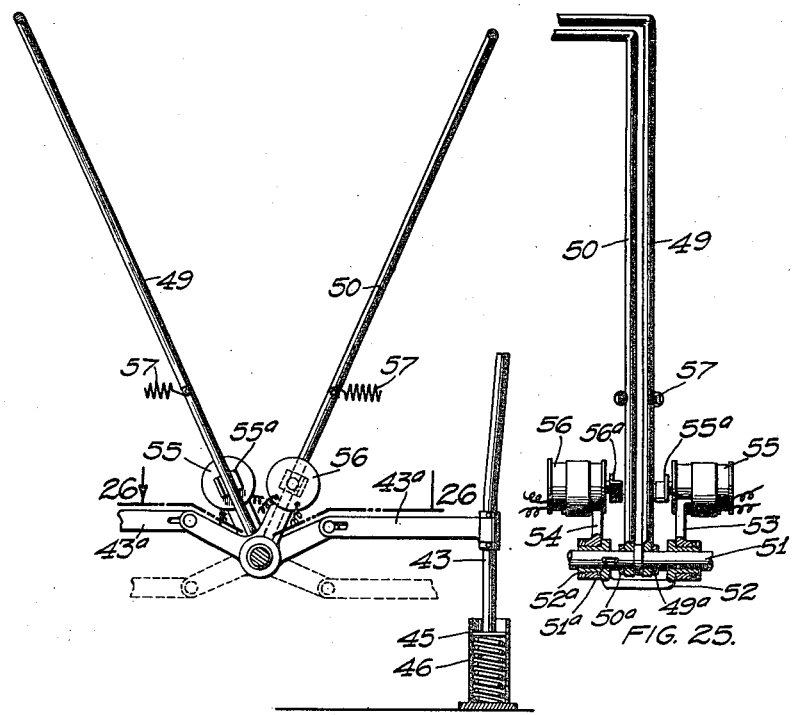
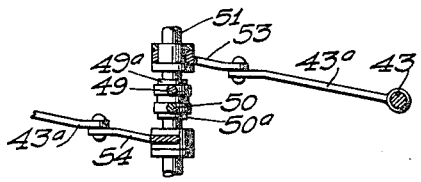
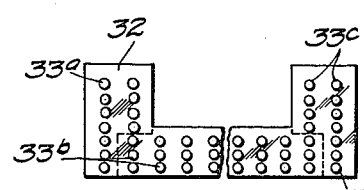
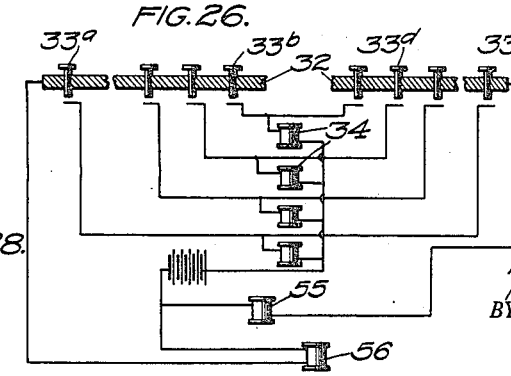
INVENTOR.
MARTIN S. RUNSVOLD.
HARRISON G. SLOANE.
BY
ATTORNEY Patented Jan. 1, 1924.

1,479,321

UNITED STATES PATENT OFFICE.

MARTIN S. RUNSVOLD AND HARRISON G. SLOANE, OF SAN DIEGO, CALIFORNIA.

MAIL CANCELING, SORTING, AND DISTRIBUTING MACHINE.

Application filed April 5, 1922. Serial No. 549,731.

*To all whom it may concern:*

Be it known that we, MARTIN S. RUNSVOLD and HARRISON G. SLOANE, citizens of the United States, residing at San Diego, in the county of San Diego and State of California, have invented a certain new and useful Mail Canceling, Sorting, and Distributing Machine, of which the following is a specification.

Our invention relates to a machine to facilitate the canceling, sorting and distribution of mail and the like, and the objects of our invention are: first, to provide a machine that will facilitate the sorting of mail so that it is placed in separate receptacles for different localities; second, to provide a machine of this class in which the selected mail for each locality is distributed to separate receptacles; third, to provide a machine of this class in which the mail is passed singly before the operator from a common mass where it may be selected and conducted through distributing means to separate receptacles; fourth, to provide a machine of this class with co-operative canceling means in connection therewith; fifth, to provide a novelly constructed means for picking the articles of mail up separately and conducting it before the operator; sixth, to provide novel means for canceling or marking the mail co-operative with said beforementioned means; seventh, to provide novel means for conducting the separate articles to certain predetermined receptacles after their selection; eighth, to provide novel means to facilitate the selection of the separate articles of mail; ninth, to provide a machine of this class which is very compact in form so that it occupies a small space relative to its efficiency; tenth, to provide a novelly constructed and operated mail sorting mechanism; eleventh, to provide a novelly constructed and operated mail distributing mechanism and twelfth, to provide a machine of this class which is very simple and economical of construction, durable, easy to operate, efficient in its action, and which will not readily deteriorate or get out of order.

Figure 2:
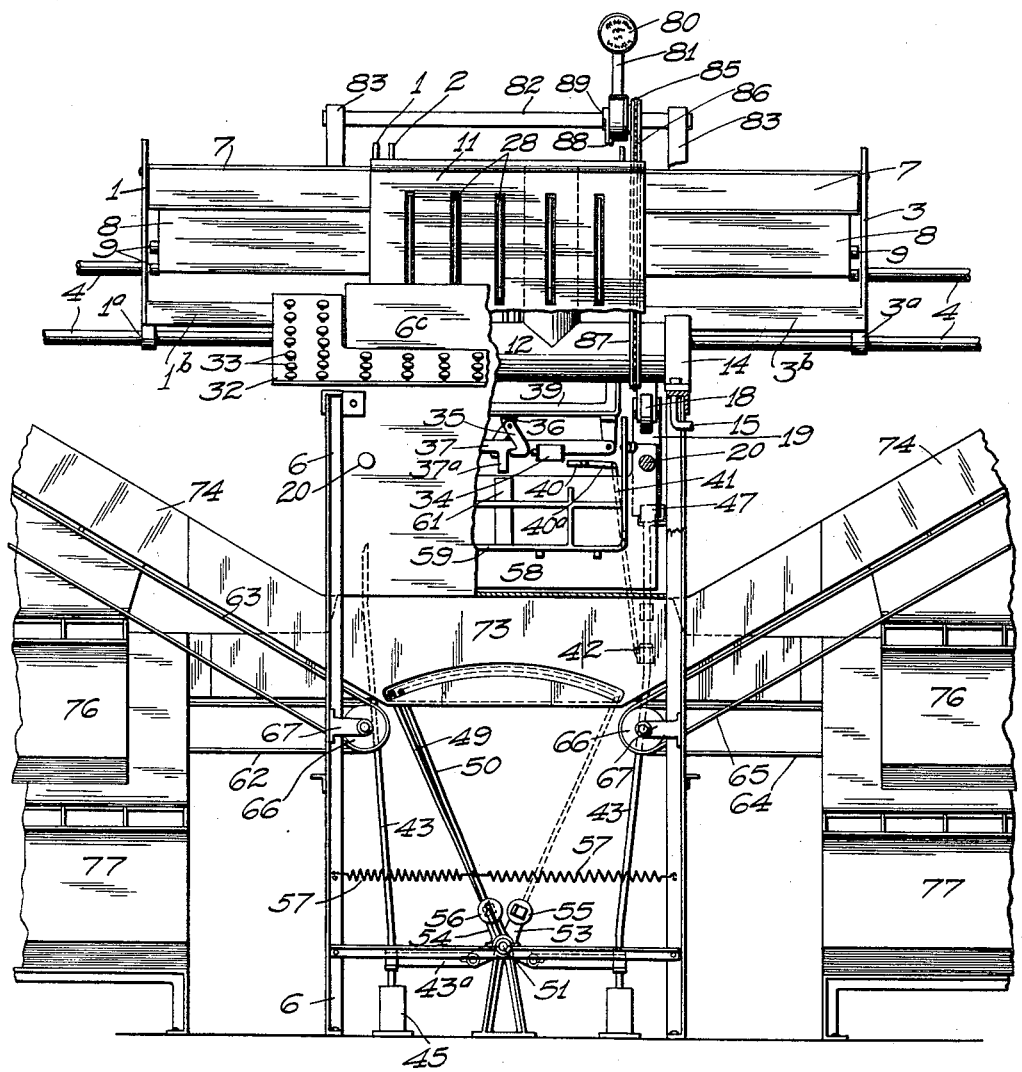
Figure 5:
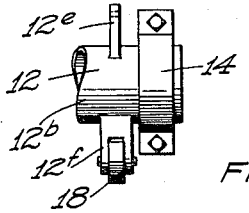
Figure 3:
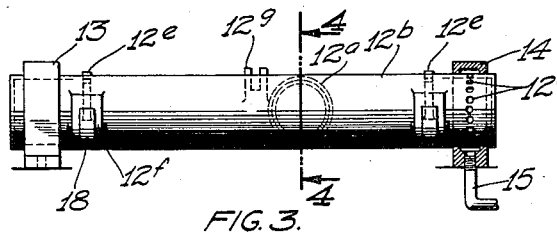
Figure 4:
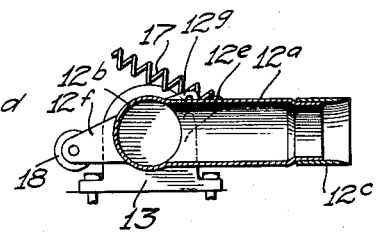
Figure 6:
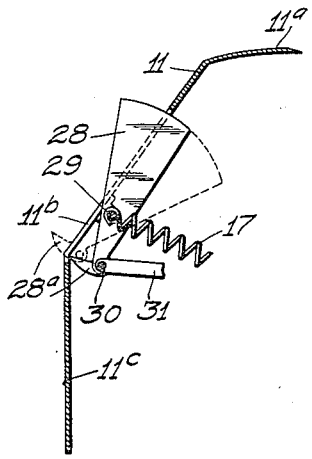
Figure 7:
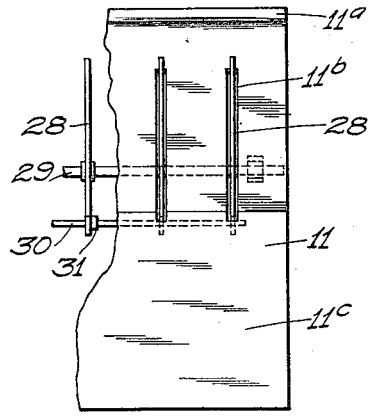
Figure 8:
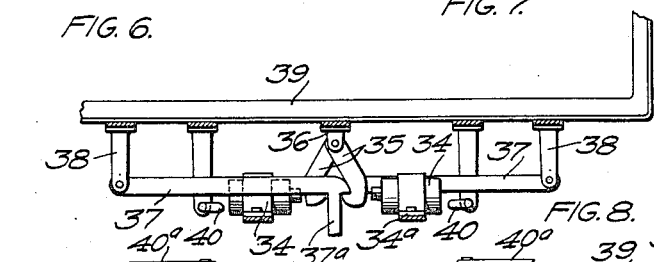
Figure 10:
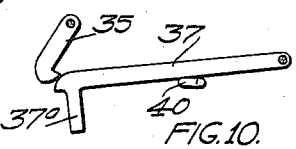
Figure 9:
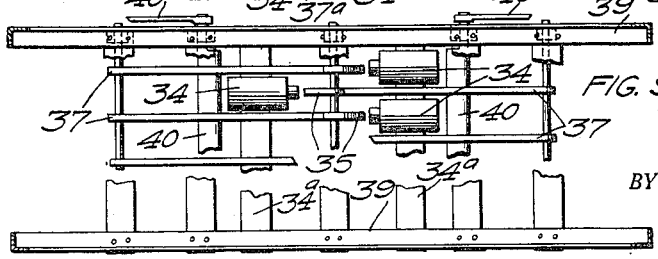

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a side elevational view of our machine showing by solid and dotted lines the same subject matter in various operative positions. Fig. 2 is a front elevational view of said machine showing some of the parts and portions broken away to facilitate the illustration and showing some portions at the side fragmentarily. Fig. 3 is an enlarged, detailed front view of the vacuum extractor for extracting the mail articles one at a time. Fig. 4 is a transverse sectional view through 4—4 of Fig. 3. Fig. 5 is a fragmentary portion of the same shown at a right angle to that of Fig. 3. Fig. 6 is an enlarged, sectional, end elevational view of the displayer for reading the destination of the letters placed thereon. Fig. 7 is a fragmentary front elevational view thereof. Fig. 8 is an enlarged, front sectional view of the selector fingers and means for operating the same. Fig. 9 is a fragmentary plan view thereof. Fig. 10 is a front elevational view of a selector finger in the disengaged and operative position. Fig. 11 is an enlarged side elevational view of the operating cam block, distributor plate and carrier member in position to clamp a letter when same is carried to the various channels of the machine. Fig. 12 is a fragment of the same view thereof showing the carrier member in the inoperative position. Fig. 13 is a fragmentary front elevational view of the distributor plate. Fig. 14 is a fragmentary front elevational view of the carrier member. Fig. 15 is a fragmentary side elevational view of the loading and feeding chamber, showing the extractor in various positions by dotted and solid lines, a fragment of the displayer table, and a letter in its path from said chamber to said displayer. Fig. 16 is a fragmentary front elevational view of the conveyers on one side of the machine. Fig. 17 is a plan view thereof. Fig. 18 is a fragmentary front elevational view of the compartments or receptacles into which the various letters are deposited. Fig. 19 is a fragmentary plan view of the channels guiding the letters from the center of the machine on the conveyers to the various receptacles. Fig. 20 is a fragmentary sectional elevational view through 20—20 of Fig. 18 of the vertical chutes discharging the letters into the receptacles from the conveyers. Fig. 21 is a side view of the canceler arm in operative position. Fig. 22 is a fragmentary side view thereof showing the dog holding the arm in a disengaged position. Fig. 23 is a rear view thereof, parts being broken away and in section to facilitate the illustration. Fig. 24 is a fragmentary front elevational view of the kickers and their operating means. Fig. 25 is a fragmentary side elevational view thereof, partly in section. Fig. 26 is a sectional view thereof through 26—26 of Fig. 24. Fig. 27 is a fragmentary plan view of the selector keyboard and Fig. 28 is an electric wiring diagram of the selector keys with the solenoids on the selector fingers and the kickers respectively.

Like characters of reference refer to similar parts and portions throughout the several views of the drawings.

The loading and feeding chambers 1, 2, and 3, guide rods 4, supports 5, main frame 6, retainer 7, weight 8, rollers 9, guide wires 10, displayer plate 11, extractor 12, extractor bearings 13 and 14, vacuum tube 15, guide wire support 16, extractor spring 17, rollers 18, cam blocks 19, guide bars 20, rocker arms 21, connecting rods 22, shaft 23, crank discs 24, pulley 25, belt 26, motor 27, blades 28, bolts 29 and 30, connecting link 31, selector keyboard 32, keys 33, solenoids 34, dogs 35, supports 36, selector arms 37, brackets 38, bracket 39, offset raising rod 40, connecting rod 41, clevis 42, push rods 43, guide brackets 44, guide members 45, springs 46, rollers 47, guide members 48, kickers 49 and 50, kicker shaft 51, yoke 52, rocker arm brackets 53 and 54, solenoids 55 and 56, spring 57, distributor plate 58, carrier member 59, spring 60, spring clip 61, conveyer belts 62, 63, 64 and 65, conveyer rolls 66, bearing brackets 67, belt 68, pulleys 69 and 70, counter shaft 71, belt 72, channels 73, guides 74, finger 75, upper receptacle 76, lower receptacle 77, chute 78, deflector 79, canceler stamp 80, canceler arm 81, axle 82, brackets 83, canceler spring 84, sprocket wheel 85, chain 86, sprocket wheel 87, dog 88, arm 89 and the rebound spring 90 constitute the principal parts and portions of our structure.

Near the middle and at the upper portion of the machine are provided three loading and feeding chambers 1, 2, and 3, each of suitable width and depth to contain a stack of letters resting horizontally on their normal upper edges with the face of said letters toward the rear of the machine. One of said chambers here referred to as the feeding chamber is always in line with the extractor tube $12^a$ of the extractor 12 while the other two of said chambers, referred to as the loading chambers, are adapted to be loaded or filled with letters arranged as mentioned above by an assistant while the machine is in operation. Said chambers are inclined downwardly and forwardly so that the contents therein move toward the front of the machine by gravity with the aid of a weight 8 mounted therein which weight is provided with rollers 9. Said chambers are shiftably mounted by the lugs $1^a$, $2^a$, and $3^a$, secured thereto, on guide rods 4 extending across the top of the machine and supported by the brackets 5 which are secured to the frame 6 of the machine and at their ends to the receptacles, not shown on the drawings. The chambers are further provided with weighted retainer 7 hinged to said chambers at their upper ends and towards the front thereof, serving to depress the letters, approaching the front of the chambers, against the bottom thereof, and to avoid a tendency of other letters to follow the extracted letter on its upward course. To prevent the contents of said chambers coming out at their front open ends there are provided strips $1^b$, $2^b$ and $3^b$ extending across the front lower ends thereof serving as a stop for the extractor in its lower or extracting position.

The extractor 12 is arranged to seize the forward letter in the feeding chamber and by a quick upward motion to slip it from the front of the stack and carry it upwardly out of the feeding chamber and forwardly overhead over the guide wires 10, dropping it upon the displayer 11. The extractor consists of a hollow axle portion $12^b$ fixed laterally before the operator in bearings 13 and 14 secured to the frame 6 of the machine, below and in front of the feeding chamber 2. From a point to the right of the center of this axle $12^b$, there extends outwardly a hollow tube $12^a$ of a diameter slightly narrower than the narrowest letter to be handled. This is fitted at its upper or free end with a rubber sleeve $12^c$ making of the end of the tube a flexible, feather-edged positive engaging edge. Through the bearings 14, arranged for that purpose, air is exhausted from the hollow tube $12^a$ through the axle $12^b$ and the holes $12^d$ provided therein, through the vacuum tube 15 secured to said latter bearing, (the source of the vacuum not shown), thus creating at the edge of the sleeve $12^c$ a constant vacuum suction. The extractor 12 consisting of the axle $12^b$ and extended tube $12^a$ is arranged to turn backwardly and forwardly through an arc of about ninety degrees, carrying the sleeve $12^c$ from a position a little above the bottom of the feeding chamber, upwardly towards the operator slightly past the perpendicular position. The rubber sleeve $12^c$ is adjustable to such a length that as it descends in its arc, it will press gently against the forward letter in the feeding chamber. When it comes to rest and before it starts to ascend, the suction seizes the forward letter firmly. The extractor tube 12ª in its ascending swing slips the forward letter out of the stack and carries it upwardly forwardly through the open portion at the forward end of the feeding chamber and over guides 10.

The guides 10 are circular in shape centering about the axle 12ᵇ, straddling the tube 12ª and secured at their lower ends to a support 16, in front of and adjacent the strip 2ᵇ at the front lower end of the loading and feeding chambers. Said support 16 is secured to the frame 6. The upper ends of the circular guides are secured to the upper edge of the displayer plate 11. When the vacuum tube reaches the end of its arc in the upward, forward movement, it draws the letter over a raised portion 10ª near the ends of the guides 10, so inclined as to pull the letter away from the edge of the rubber sleeve at the end of the tube. The projection of the circular portion 11ª of the displayer plate 11 between the letter and the suction end of the vacuum tube when the same is in its forward position serves to cut off the suction therefrom, thus allowing the letter to fall forward on the displayer 11.

The extractor 12 is held in an upright position by the springs 17 secured to the lug 12ᵉ on the tube side of the extractor at one end and its other end to the bolt 29. The extractor receives its reciprocating revoluble motion from the rollers 18 secured in lugs 12ᶠ thereon, riding on the upper face of the cam blocks 19. Said cam blocks are reciprocably mounted on the guide rods 20 which are mounted inside of and to the frame 6. Said cam blocks receive their reciprocating motion from the rocker arms 21 pivoted at their lower ends at 6ª of the frame 6. The upper ends of said arms are pivotally connected to the cam blocks 19 through the medium of the connecting rods 22. A shaft 23 revolubly mounted on the brackets 6ᵇ at the rear of the frame 6 is provided with crank discs 24 at each end thereof engaging longitudinal slots 21ª in said rocker arms. Said shaft is provided with a pulley 25 intermediate said crank discs and driven by the belt 26 from the motor 27.

The displayer member 11 is a plate inclined at an angle convenient for reading and it is secured to the frame 6. Through the bottom of said plate protrude a row of fingers 28ª which support the bottom edge of the letter stationary until the address is read by the operator. Said fingers are secured to and preferably made integral with the blades 28 which are pivotally mounted on the bolt 29 secured to the back side of the inclined portion of the displayer plate 11. Said blades are bolted together at their lower ends by the bolt 30, thus making said blades rotate as a single unit about the bolt 29 as a pivot. A link 31 is pivotally secured thereto and to a lug 12ᵍ on the upper side of the extractor axle. Thus as the said axle revolves forwardly the fingers 28ª are thrust forwardly holding the letter on the displayer plate 11 while the upper ends of the blades are drawn backwardly and below the said displayer plate 11 through slots 11ᵇ cut therein for that purpose. As the axle revolves backwardly the said fingers are withdrawn and the upper portions of said blades force the letter, that has been deposited thereon in the meantime by the extractor tube 12ª, off the displayer plate, assisting it to fall rapidly and upright between the apron 11ᶜ of said plate and the guard portion 6ᶜ of the frame into the carrier at the front end of the distributor which will be described later.

A selector keyboard 32 for selecting the channel or destination of the letter on the displayer plate is mounted in front of the machine and in front of the operator, and secured to the frame 6 by means of the brackets 32ª. Said keyboard is provided with a plurality of keys, preferably electrical, contact buttons 33 labeled to correspond with the receptacles into which the mail is to be distributed. The said keyboard is preferably divided into four parts, the left upper, left lower, right upper and right lower sections with the keys 33ª, 33ᵇ, 33ᶜ, and 33ᵈ corresponding respectively. Said keys are electrically connected in pairs, the upper keys 33ª and 33ᶜ as well as the lower keys 33ᵇ and 33ᵈ operating single solenoids 34, as shown best in Fig. 28 of the drawings. The said solenoids are spaced in staggered relation with each other for economy of space, one behind the other and one above each channel and all mounted on supports 34ª supported at the front of the machine by the apron 11ᶜ of the frame 6 and extending beyond the last solenoid and supported by the bracket 39 secured to the frame 6. A series of dogs 35 each pivotally mounted at its upper end on supports 36 secured to the frame of the machine are provided one for each solenoid in line with said solenoid and its free end adapted to be attracted by and engage the core thereof. Said dogs are adapted to engage selector arms 37 arranged directly over the path of the distributor means. Said selector arms are provided with lugs or fingers 37ª at their lower edge adapted to engage a spring clip on the carrier member of said distributor means when said selector arms are released by said dogs. Said selector arms are pivotally mounted on brackets 38 secured to the frame of the machine. For each pair of keys, one in the right hand section of the keyboard and a corresponding one in the left hand section thereof, there is provided one selector finger; that is to say, by pressing either of the keys of this pair the corresponding arm and attached finger will be released and drop, and the selection of a particular finger determines the distance which a letter will travel from the front of the machine toward the back before it is dropped into a channel below to take up its travel to the right or to the left. To raise the selector arms and permit the dogs to engage the same for the next cycle of operations there are provided two offset raising rods 40, one for each side pivotally mounted on said frame and provided at the rear end of each with an arm 40$^a$ adapted to rotate said offset raising rods. Said arm is pivotally connected to a clevis 42 by the connecting rod 41. Said clevis is secured to the push rod 43 which is reciprocably mounted at its upper portion in the brackets 44 secured to the frame 6 and at the lower end in a cylinder or guide member 45 and is forced upwardly by a spring 46 within said guide member. The push rod 43 receives its reciprocating motion from the lower surface 19$^a$ of the cam block 19 by engagement therewith through the roller 47 which bears on said surface. Said push rod is further guided by the guide member 48 secured to the frame 6 and the bracket 44, by engaging the extended portion of the roller beyond the edge of said cam. For continuing the letter on its course to the left or right as mentioned above, there are provided kickers 49 and 50 extending from the front to rear of the machine under the path of the distributor. By depressing any key on the right hand side of the keyboard, the kicker is set to throw the letter on to the right hand conveyers, while by depressing any key on the left hand side of the keyboard it is set to throw the letter on to the left hand conveyers. This is done by a sharp impact of either of said kickers against the end of the letter which pushes or projects the same in front of it as the said kicker swings through the circular path above the bottom of the channels wherein the letter has been dropped by the distributor. The kickers are operated by the push rods 43 which receive a sharp down thrust from the cam blocks 19 as described above. Said kickers are U-shaped, one being smaller than the other, and are pivotally mounted on a shaft 51 and secured in position thereon by the rings 49$^a$ and 50$^a$ respectively secured to said shaft. Straddling the pivotal ends of said kickers and said rings and shiftably mounted on said shaft is the yoke member 52. Pivotally mounted on either end of said yoke member are the bell crank brackets 53 and 54. Secured at the upper ends thereon are the solenoids 55 and 56 respectively provided with clips 55$^a$ and 56$^a$ at the ends of the cores adapted to alternately adjacent the kickers adapted to alternately engage said kickers. The other ends of said bell cranks are pivotally secured to the arms 43$^a$ which are mounted on and allowed to swing freely in a horizontal plane on the push rods 43. The contact made by depressing any key on the left hand section of the keyboard permits a current to pass through the foremost solenoid 56 as shown in Fig. 28 of the drawings, causing a mutual attraction of its core, which is fixedly secured therein, and the kicker 50 causing said solenoid, together with the yoke member 52 and the solenoid 55, to be shifted backwardly on the shaft 51, which yoke is kept from revolving thereon by the pin 52$^a$ engaging a slot 51$^a$ in said shaft. Thus the clip 56$^a$ is allowed to engage the arm of the kicker 50 and when the push rod is thrust downwardly as described above the foremost solenoid 56 will travel quickly to the left carrying the kicker 50 with it and thus carrying or kicking the letter, dropped by the distributor into the channels below its path, onto the conveyers running to the left hand side of the machine. By the same action of the push rods the rear solenoid 55 is quickly thrust to the right but since the clip secured thereon is pulled away or disengaged from the kicker 49, said kicker remains in its position of rest. Springs 57 are secured to each of said kickers and to the frame of the machine adapted to immediately draw said kicker or kickers back to their original positions for the next cycle of operation. Similar action takes place through the kicker 49 when an impulse is received through the solenoid 55 by depressing any of the keys in the right hand section of the key board as shown in the diagram in Fig. 28 of the drawings thus causing the letter to be projected onto the conveyer on the right hand side of the machine.

The distributor consists of an upright plate 58 sliding backwardly and forwardly in a space immediately below the selector fingers 37$^a$ and immediately above the path of the kickers 49 and 50. The plate is carried at and secured to the forward end of the sliding cam blocks 19 which slide backwardly and forwardly upon a pair of guide bars as described above. Extending in front of the distributor plate 58 is a carrier member 59 so hinged at 59$^a$ to the arms 19$^b$ on the cam blocks 19 that when in operative position the bottom rod 59$^b$ clamps against the plate and therefore holds and carries upright the letter that may be clamped therebetween. By pressure on the projection 59$^c$ of the side rods 59$^d$ at the top of the carrier member against the guard plate 6$^c$ of the frame 6 said member is caused to open at the bottom or disengage from the distributor plate and remains open or disengaged as long as the distributor plate is at the front end of the machine and in the path of a letter falling from the displayer plate 11. As it withdraws from this position the carrier member automatically closes upon the letter by the action of the spring 60 secured thereto and said distributor plate, and is carried against said plate until it reaches the point where a selector finger has been dropped which is adapted to engage a spring clip 61 secured to said carrier member. On encountering this finger the projecting spring clip is tripped, thereby releasing the letter and causing it to drop from the distributor plate into the channel immediately below it.

The conveyer consists of endless belts 62 and 63, lower and upper, on the left hand side and 64 and 65, lower and upper, on the right hand side respectively upon rolls 66 so that the upper surfaces of said belts move away from the machine to left and right respectively. Said upper belts 63 and 65 are divided into two sections 63 and 63$^a$ and 65 and 65$^a$ straddling the lower belts 62 and 64 respectively. The upper and lower belts on each side are driven by single rolls at their ends nearest the middle of the machine. Said rolls are revolubly mounted on bearing brackets 67 secured to the frame 6. Said lower rolls are driven by quarter-turn belts 68 engaging pulleys 69 on the shaft of said lower rolls and pulleys 70 on a counter shaft 71 which is driven by a belt 72 from the motor 27. Letters are held upright, with the long edge resting on the conveyer belts, by stationary guides 74 extended from the channels 73 and extending a few inches above and along the various belts. The middle channels are carried on a level to the middle lower conveyer belts while the outer channels, front and rear, are carried up at an angle from the rollers so that the receptacles may be placed below them and above the lower belt. A pair of guides thus forms a narrow channel with the belt wide enough for the thickest letter to pass through freely. Each channel reaches from a point under the path of the distributor to a point directly above the receptacle for which the latter is intended. Thus, when a letter is dropped into any channel and is projected on to the right hand or left hand belt, it has no other course to follow and receives no interference until it reaches a point above its proper receptacle. The direction of each channel is toward the edge of the respective belts, that of the channels formed by the upper belts being toward the inner edges thereof. At the end of the channel the letter therein is forced off the belt by reason of the belt moving diagonally with respect to the said channels; thus it loses its bottom support and at the same time encounters a projecting finger 75 at the end of said channel which turns it, end downward, into its predetermined receptacle.

The receptacles consist of compartments or receptacles 76 and 77, the former or upper receptacles communicating with the upper conveyers and the latter with the lower conveyers. The receptacles receiving articles of mail from the forward conveyers and forward portion of the center conveyers open or face the front of the machine or the operator's position, and the receptacles receiving the mail from the other portions of the conveyers open towards the back of the machine. Each receptacle is wide and long enough to hold letters of the size to be handled and is deep enough to contain a considerable stack of letters. The bottom and the back of the receptacles are inclined sufficiently to prevent the stack from falling forward as the letters are fed on top of it. At the upper end of each receptacle a chute 78 receives the letter from the point where it is shifted and tipped off the belt. After falling through said chute, the letter strikes a deflector 79 at the lower end of said chute which changes the course of the letter sufficiently to make it fall flat on the top of the stack below in the receptacle. Said receptacles are open faced so that the contents therein are visible at all times and may be easily removed.

A canceler for canceling the articles of mail is provided at the upper part of the machine and consists of an appropriate stamp 80 carried on the end 81$^a$ of a short arm 81 which turns through an arc of about 180 degrees. Said canceler arm is located above the extractor 12 and displayer plate 11 in such a position that said arm when down and furthest forward comes into contact with the upper right hand portion of a letter resting upon the displayer plate, for the purpose of canceling the same. The arm 81 is revolubly mounted upon the stationary axle 82 which is mounted on the brackets 83 secured to the upper end of the frame 6 at either end thereof. A spiral spring 84 has its inner end 84$^a$ secured to the stationary axle and its outer end 84$^b$ to the arm 81. A sprocket wheel 85 is revolubly mounted on the said axle and adapted to engage the hub of said canceler arm. Said sprocket wheel is driven by a chain 86 from a sprocket 87 approximately twice the diameter of the sprocket wheel above mentioned and is mounted on the axle 12$^b$ of the extractor 12. Thus when the wheel 85, revolubly mounted on said axle, is turned in a clockwise direction said wheel engages a projection 81$^b$ on the arm 81 as shown best in Figs. 21, 22, and 23 of the drawings and said arm is carried upwardly and backwardly in the same direction until it and the wheel come to rest after completing approximately half a revolution. At this point a dog 88 mounted on an arm 89 secured to the said axle, drops into a notch 81$^c$ in said arm holding the same in the upright position, the spring 84 having meanwhile been wound tight by the movement of the arm around the axle. The wheel 85 immediately on coming to rest at the end of the backward stroke is, by reason of the change of direction of the extractor arm and therefore of the sprocket and chain mounted thereon, started backwardly in a counter-clockwise direction. The arm 81 being held by the dog 88, however, does not accompany said wheel. Near the end of the counter-clockwise course of the wheel or the forward movement of the extractor the arm 85<sup>a</sup> on the said wheel 85 begins to engage and force inwardly the extended end of the dog 88. At the moment the wheel comes to rest again, that is, when the extractor tube is in its forward position, the dog is forced out of the notch 81<sup>c</sup> in the hub of said canceler arm. Immediately the tension of the spring secured to the arm 81 pulls it forward and permits it to descend with sufficient force to imprint the cancellation mark from the stamp 80 upon the letter awaiting it on the face of the displayer plate 11. A rebound spring 90 secured in the under side of the canceler arm moves said arm upwardly at once away from the letter where it is picked up by the next clockwise movement of the wheel 85.

The electric motor 27 is employed to operate a suction fan or pump not shown on the drawings which provides a vacuum in the extractor tube 12<sup>a</sup> and the hollow axle through the vacuum tube 15. Said motor also provides a power for the other necessary operating parts of our machine as described above.

It is obvious that during the short period of rest while the extractor tube 12<sup>a</sup> is at its extreme forward position, the letter brought forward by said extractor tube is deposited on the displayer plate 11 by reason of the projection 11<sup>a</sup> of said plate cutting off the vacuum from said extractor tube. At the same time the extractor comes to rest, the canceler arm 81 is released from the tension of the spring 84, causing it to come down with sufficient force on the letter on said displayer plate to cancel the said letter. Also during the period of rest of the extractor the operator is given sufficient time to read the address on said letter to determine its destination or the course to the proper receptacle provided for that destination. Immediately after reading the address on the letter, which normally occurs at the beginning of the backward stroke of the extractor tube or at completion of the forward movement of the cam block, the operator presses a key 33, labeled accordingly, on the selector keyboard 32, which causes a current to be passed through the proper solenoids as previously described, thus releasing the proper selector arm 37 and permitting its finger to drop down in the path of the spring clip 61 of the carrier member 59 ready to engage said spring clip on its return trip or backward movement of the cam blocks 19.

It is further obvious that the period of rest, referred to above, occurs when the cam block 19, during its backward stroke, is disengaged from the roller 18 of the extractor 12 and does not engage said roller or set the said extractor in motion again until said cam block has gone to the end of its backward stroke and returned the same distance therefrom to reengage said roller. Near the end of the backward stroke of the cam block, the rollers on the upper ends of the push rods 43 engage the lower surface of said cam block when moving backwardly and force said push rods downwardly. The offset raising rods 40 connected thereto by the connecting links 41 are rotated, raising the offset portion thereon and therefore raising the selector arm 37 that may have been down and disengaged from its dog 35, to reengage the latter. Also during the downward stroke of the push rods, the bell crank brackets 53 and 54 supporting the solenoids 55 and 56 respectively are forced to rotate by reason of their pivotal engagement with the extended arms 43<sup>a</sup> of said push rods. The letter, now in the channels, whose destination of course to a receptacle having been determined by pressing the proper key and therefore passing a current through the proper solenoids 55 or 56 which causes said solenoids, shiftably mounted on the shaft 51, to engage one of the kickers 49 or 50 respectively, is projected or kicked to the right or left onto the conveyers.

It is further obvious that the cam blocks 19, shaped as shown and having a uniform reciprocating motion imparted to it through the mechanism and motor 27 as described above, engage the rollers 18 in their forward movement causing the extractor to be swung backwardly in line with the feeding chamber, and the vacuum therein causes the extractor tube to seize the letter at the lower and forward end of the feeding chamber. The letter, deposited on the displayer plate 11 by the previous forward stroke of the extractor tube, is forced downwardly by the receding action of the fingers 28<sup>a</sup> and the forward action of the blades 28 through the slots in the said displayer plate by the link 31 connected to the lower end of said blades and to the receding lugs on the extractor axle 12<sup>b</sup>. The cam blocks have by this time moved to their extreme forward positions with the distributor plate 58 secured thereto at their forward ends, and the carrier member 59, having been disengaged from the said distributor plate as previously described, is in a position to receive the letter dropped from the displayer plate. Also during the forward movement of the cam blocks or the backward stroke of the extractor tube the revolving action of the extractor axle causes the chain mounted on the sprocket wheel 87 thereon to rotate the sprocket wheel 85 mounted on the stationary axle 82. The sprocket wheel 85, in its clockwise rotation, is adapted to positively engage the canceler arm and carries the same with it, away from the slightly disengaged position from the displayer plate caused by the rebound spring 90, to the position shown by dotted lines in Fig. 1 of the drawings and as previously described.

It is further obvious that at the beginning of the backward stroke of the cam block, the letter dropped from the displayer plate is caught and clamped near its upper edge between the carrier member 59 and the distributor plate 58 and carried toward the rear of the machine over the various channels 73 and dropped in one of said channels by the spring clip, on said carrier member, being tripped by the finger of the selector arm over the predetermined channel, thus disengaging said carrier member from said distributor plate and allowing said letter to drop in said channel. Said letter leaves said channel as described above. Also at the beginning of the backward stroke of the cam block the extractor tube is released by said cam and pulled forward by the spring 17 secured thereto, carrying with it another letter to be deposited on the displayer plate. Thus the machine is ready for the next cycle of operations.

Though we have shown and described a particular construction, combination and arrangement of parts and portions we do not wish to be limited to this particular construction, combination and arrangement but desire to include in the scope of our invention the construction, combination and arrangement substantially as set forth in the appended claims.

Having thus described our invention what we claim as new and desire to secure by Letters Patent is:

1. In a machine of the class described, a feeding chamber, a means for singly extracting the contents from said chamber, a display member spaced and separated from said feeding chamber for displaying the contents of said chamber and adapted to communicate with said extracting means and a distributing means adapted to receive said contents from the displayer member and distribute the same.

2. In a machine of the class described, a feeding chamber, a means for singly extracting the contents from said chamber, a displayer member spaced and separated from said feeding chamber for displaying the contents of said chamber and adapted to communicate with said extracting means, a distributing means adapted to receive said contents from the displayer member and distribute the same and receptacles communicating with said distributing means for receiving the contents of said feeding chamber through said distributing means.

3. In a machine of the class described, an inclined feeding chamber, a means for singly extracting the contents from said chamber, a displayer member spaced and separated from said feeding chamber for displaying the contents of said chamber and adapted to communicate with said extracting means, a distributing means adapted to receive said contents from the displayer member and distribute the same, receptacles communicating with said distributing means for receiving the contents of said feeding chamber through said distributing means and selecting means for selecting the proper receptacles for said contents.

4. In a machine of the class described, an inclined feeding chamber, a means for singly extracting the contents from said chamber, a displayer member spaced and separated from said feeding chamber for displaying the contents of said chamber and adapted to communicate with said extracting means, a distributing means adapted to receive said contents from the displayer member and distributing the same, receptacles communicating with said distributing means for receiving the contents of said feeding chamber through said distributing means, selecting means for selecting the proper receptacles for said contents and means connected with said selecting means for governing the movements of said distributing means and said contents.

5. In a machine of the class described, an inclined feeding chamber, a means for singly extracting the contents from said chamber, a displayer member spaced and separated from said feeding chamber for displaying the contents of said chamber and adapted to communicate with said extracting means, a distributing means adapted to receive said contents from the displayer member and distribute the same, conveyer means for receiving said contents from said distributor, and receptacles communicating with said conveyer means for receiving the contents of said feeding chamber through said distributing means and said conveying means.

6. In a machine of the class described, an inclined feeding chamber, a means for singly extracting the contents from said chamber, a displayer member spaced and separated from said feeding chamber for displaying the contents of said chamber and adapted to communicate with said extracting means, a distributing means adapted to receive said contents from the displayer member and distribute the same, conveyer means for receiving said contents from said distributor, receptacles communicating with said conveyer means for receiving the contents of said feeding chamber through said distributng means and said conveying means, and selecting means for selecting the proper receptacles for said contents.

7. In a machine of the class described, an inclined feeding chamber, a means for singly extracting the contents from said chamber, a displayer member spaced and separated from said feeding chamber for displaying the contents of said chamber and adapted to communicate with said extracting means, a distributing means adapted to receive said contents from the displayer member and distribute the same, conveyer means for receiving said contents from said distributor, receptacles communicating with said conveyer means for receiving the contents of said feeding chamber through said distributing means and said conveying means, selecting means for selecting the proper receptacles for said contents, and means connected with said selecting means for governing the movement of said distributing means and said contents.

8. In a machine of the class described, a main frame, an inclined feeding chamber mounted at the upper portion of said frame, an extracting means pivotally mounted to communicate with said chamber, a displayer member secured to the front end of said frame and spaced and separated from said feeding chamber for displaying the contents of the said chamber and adapted to communicate with said extracting means, a distributing means communicating with said displayer member and adapted to receive the centents therefrom and to distribute the same, receptacles communicating with said distributing means for receiving the contents of said feeding chambers through said distributing means.

9. In a machine of the class described, inclind loading and feeding chambers shiftably mounted, an extractor member in line with one of said chambers, a displayer member spaced and separated from said feeding chamber and communicating with said extractor member for displaying the contents extracted from said chambers, distributing means communicating with said displayer and adapted to receive the contents therefrom, conveyer means communicating with said distributing means and adapted to receive said contents therefrom, receptacles communicating with said conveyer means for receiving said contents.

10. In a machine of the class described, inclined loading and feeding chambers shiftably mounted, an extractor member in line with one of said chambers, a displayer member spaced and separated from said feeding chamber and communicating with said extractor member for displaying the contents extracted from said chambers, conveyer means communicating with said displayer means and adapted to receive said contents therefrom and receptacles communicating with said conveyer means for receiving said contents.

11. In a machine of the class described, a main frame, inclined loading and feeding chambers shiftably mounted at the upper portion of said frame, an extractor member reciprocably mounted at the upper portion of said frame and in line with one of said chambers and communicating therewith, a displayer member mounted at the front end of said frame spaced and separated from said feeding chamber and communicating with said extractor member for displaying the contents extracted from said chambers, a distributing means communicating with said displayer and adapted to receive said contents therefrom, conveyers communicating with said distributing means and adapted to receive said contents from said distributor means, receptacles adapted to receive said contents from said conveyers.

12. In a machine of the class described, a main frame, loading and feeding chambers shiftably mounted at the upper back portion of said frame, an extractor member reciprocably mounted at the middle upper portion of said frame and in line with one of said chambers adapted to extract the contents therefrom, a displayer member communicating with said extractor member for displaying the contents extracted from said chamber, a canceling means adapted to communicate with said displayer for marking the contents of said chamber displayed on said displayer member, conveyers communicating with said displayer member adapted to receive the canceled contents therefrom and receptacles adapted to receive the contents from said conveyers.

13. In a machine of the class described, a main frame, loading and feeding chambers shiftably mounted at the upper back portion of said frame, an extractor member reciprocably mounted at the upper middle portion of said frame and in line with one of said chambers adapted to extract the contents therefrom, a displayer member communicating with said extractor member for displaying the contents extracted from said chambers, a canceling means for marking the contents of said chamber displayed on said displayer member, a distributing means communicating with said displayer and adapted to receive the canceled contents therefrom, conveyers communicating with said distributing means and adapted to receive said contents therefrom, and receptacles adapted to receive the contents from said conveyers.

14. In a machine of the class described, a main frame, loading and feeding chambers shiftably mounted transversely with the axis of the frame and secured to the upper portion thereof, an extractor member including a vacuum tube adapted to singly extract the articles contained in said chambers, a displayer member communicating with said extractor member for displaying the articles extracted from said chambers, a canceling means for canceling said articles displayed on said displayer member, a distributing plate, and a carrier member pivotally mounted to said plate adapted to receive the articles from said displayer member and adapted to distribute the same.

15. In a machine of the class described, a main frame, loading and feeding chambers shiftably mounted transversely with the axis of the frame and secured to the upper portion thereof, an extractor member including a vacuum tube adapted to singly extract the articles contained in said chambers, a displayer member communicating with said extractor member for displaying the articles extracted from said chambers, a canceling means for canceling said articles displayed on said displayer member, a distributing plate, a carrier member pivotally mounted and engaging said plate adapted to receive the articles from said displayer member, conveyers adapted to receive the articles from said distributor plate and said carrier member and receptacles adapted to receive the articles from said conveyers.

16. In a machine of the class described, a main frame, loading and feeding chambers shiftably mounted on said frame, a vacuum extractor pivotally mounted at the upper portion of said frame and adapted to singly extract the articles contained in each of said chambers, one at a time, guide bars secured to said frame, cam blocks reciprocably mounted on said guide bars adapted to impart to said vacuum extractor a reciprocating revoluble motion, a displayer member communicating with said vacuum extractor for displaying the articles extracted from said chambers, a canceler for marking the articles displayed on said displayer member, means for operating said canceler, conveyers communicating with and adapted to carry the articles from said displayer member, and receptacles provided with each conveyer and adapted to receive the articles therefrom.

17. In a machine of the class described, a main frame, loading and feeding chambers shiftably mounted on said frame, a vacuum extractor pivotally mounted at the upper portion of said frame and adapted to singly extract the article contained in each of said chambers, one at a time, guide bars secured to said frame, cam blocks reciprocably mounted on said guide bars adapted to impart to said vacuum extractor a reciprocating revoluble motion, a displayer member communicating with said vacuum extractor for displaying the articles extracted from said chambers, a canceler for marking the articles displayed on said displayer member, means for operating said canceler, a distributor plate mounted on said cam blocks, a carrier member pivotally mounted on the extended arm of said cam block adapted to engage said distributing plate for receiving the articles from said displayer plate and clamping the same there between, means for releasing the articles clamped between said distributor plate and said carrier member, conveyers communicating with and adapted to carry the articles from said distributor plate and said carrier member, and receptacles provided with each conveyer and adapted to receive the articles therefrom.

18. In a machine of the class described, a main frame, loading and feeding chambers shiftably mounted on said frame, a vacuum extractor pivotally mounted at the upper portion of said frame and adapted to singly extract the article contained in each of said chambers, one at a time, guide bars secured to said frame, cam blocks reciprocably mounted on said guide bars adapted to impart to said vacuum extractor a reciprocating revoluble motion, a displayer member communicating with said vacuum extractor for displaying the articles extracted from said chambers, a canceler for marking the articles displayed on said displayer member, means for operating said canceler, a distributor plate mounted on said cam blocks, a carrier member pivotally mounted on the extended arm of said cam block adapted to engage said distributor plate for receiving the articles from said displayer plate and clamping the same there between, means for releasing the articles clamped between said distributor plate and said carrier member, channels adapted to receive the articles from said carrier member, conveyers communicating with and adapted to carry the articles from said channels, and receptacles provided with each conveyer and adapted to receive the articles therefrom.

19. In a machine of the class described, a main frame, loading and feeding chambers, shiftably mounted on said frame, a vacuum extractor reciprocably mounted at the upper portion of said frame and adapted to singly extract the article contained in each of said chambers, one at a time, guide bars secured to said frame, cam blocks reciprocably mounted on said guide bars adapted to impart to said vacuum extractor a reciprocating revoluble motion, a displayer member communicating with said vacuum extractor for displaying the articles extracted from said chambers, a canceler for marking the articles displayed on said displayed member, means for operating said canceler, a distributor plate mounted on said cam blocks, a carrier member pivotally mounted on the extended arm of said cam block adapted to engage said distributing plate for receiving the articles from said displayer plate and clamping the same there between, and a selecting means for selecting the proper channels for said articles, channels adapted to receive the articles from said carrier member, conveyers communicating with and adapted to carry the articles from said channels, and receptacles provided with each conveyer and adapted to receive the articles therefrom.

20. A machine of the class described, including a main frame, loading and feeding chambers, shiftably mounted on said frame, a vacuum extractor pivotally mounted at the upper portion of said frame and adapted to singly extract the article contained in each of said chambers, one at a time, guide bars secured to said frame, cam blocks reciprocably mounted on said guide bars adapted to impart to said vacuum extractor a reciprocating revoluble motion, a displayer member communicating with said vacuum extractor for displaying the articles extracted from said chambers, a canceler for marking the articles displayed on said displayer member, means for operating said canceler, a distributor plate mounted on said cam blocks, a carrier member pivotally mounted on the extended arm of said cam block adapted to engage said distributing plate for receiving the articles from said displayer plate and clamping the same there between, and a selecting means for selecting the proper channels for said articles, channels adapted to receive the articles from said carrier member, conveyers communicating with and adapted to carry the articles from said channels, receptacles provided with each conveyer and adapted to receive the articles therefrom, and a means connected with said selecting means for tripping said carrier member over the proper channel.

21. In a machine of the class described, a feeding chamber, an extracting means for singly extracting the articles placed in said chamber, a displayer member communicating with said extracting means for displaying said articles, channels communicating with said displayer member, conveyers communicating with said channels adapted to receive the articles placed within said channels, guide members extending from said channels over and diagonally with the longitudinal axis of said conveyers forming with said conveyers channels with moving bottoms and terminating at the edge of said conveyers, receptacles provided for and communicating with each of said channels.

22. In a machine of the class described, an inclined chamber open at its forward lower end adapted to contain articles therein in a substantially upright position, a weight adapted to bear against the rear upper end of the bunch of articles contained therein and a vacuum actuated extractor adapted to communicate with the open end of said chamber and singly engage and extract the articles therefrom.

23. In a machine of the class described, a chamber open at its forward end adapted to contain articles therein in a substantially upright position, a retainer pivotally mounted in said chamber adapted to engage the upper edge of the article and support the articles therein at its open end, and a vacuum actuated extractor adapted to communicate with the open end of said chamber and singly engage and extract the articles therefrom.

24. In a machine of the class described, a chamber open at its forward end adapted to contain articles therein in a substantially upright position, a weight adapted to bear against the rear end of the bunch of articles contained therein, a retainer pivotally mounted in said chamber adapted to engage the upper edge of the article and support the articles therein at its open end, and a vacuum actuated extractor adapted to communicate with the open end of said chamber and singly engage and extract the articles therefrom.

25. In a machine of the class described, inclined interchangeably positioned chambers, open at one end and adapted to contain articles therein in a substantially upright position and a vacuum actuated extractor adapted to communicate with the open end of each of said chambers and singly engage and extract the articles therefrom.

26. In a machine of the class described, a chamber, a vacuum actuated extractor adapted to singly extract articles contained in said chamber, and guides positioned contiguous to the path of the end of said extractor for guiding said articles extracted from said chamber.

27. In a machine of the class described, a chamber, a vacuum actuated extractor adapted to singly extract articles contained in said chamber, guides for guiding said articles extracted from said chamber and a means in connection with said guides for disengaging said articles from said vacuum extractor.

28. In a machine of the class described, a chamber, a vacuum actuated extractor adapted to singly extract articles contained in said chamber, a means positioned to engage the open end of said extractor for disengaging said articles from said extractor and means for cutting off the vacuum therein from said article.

29. In a machine of the class described, a vacuum actuated extractor pivotally mounted adapted to singly extract letters prearranged in a substantially upright position flat against each other, a means for disengaging said extracted letters from said extractor, a means positioned to engage the open end of said extractor for cutting off the vacuum therein from said letters and a displayer member communicating with said extractor adapted to display said letters thereon.

30. In a machine of the class described, a displayer member, a means for singly feeding articles on to said displayer member and depositing the same in a convenient position for the examination or reading of the written or printed matter thereon, fingers for temporarily retaining said article in said position and means for withdrawing said fingers.

31. In a machine of the class described, a displayer member, a means for singly feeding articles on to said displayer member and depositing the same in a convenient position for the examination or reading of the written or printed matter thereon, fingers for temporarily retaining said article in said position, means for withdrawing said fingers, and blades communicating with the last mentioned means for discharging said articles from said displayer member.

32. In a machine of the class described, a displayer member adapted to singly receive articles thereon in a position convenient for examination, channels communicating with said displayer member adapted to receive said articles therefrom, keys labeled to correspond with said channels and means communicating with said keys for directing the course of each displayed article to the proper channel.

33. In a machine of the class described, a means for carrying and distributing the articles whose classification has previously been determined, classified receptacles communicating with said means for receiving said articles, keys labeled to correspond with each of said receptacles, arms communicating with each of said keys and provided with fingers adapted to check the movements of said distributing means.

34. In a machine of the class described, a means for carrying and distributing articles whose classification has previously been determined, means for operating said distributing means, classified receptacles communicating with said means for receiving said articles, keys labeled to correspond with each of said receptacles, arms communicating with each of said keys and provided with fingers adapted to check the movements of said distributing means.

35. In a machine of the class described, a distributor plate, a carrier member engaging said distributor plate and adapted to receive and clamp there between articles whose classification has previously been determined, means for reciprocably operating said distributor plate and said carrier member, and classified receptacles communicating with said plate and said carrier member for receiving said articles therefrom.

36. In a machine of the class described, a distributor plate, a carrier member engaging said distributor plate and adapted to receive and clamp there between articles whose classification has previously been determined, means for reciprocably operating said distributor plate and said carrier member, classified receptacles communicating with said plate and said carrier member for receiving said articles therefrom, keys labeled to correspond with each of said receptacles and means communicating with said keys adapted to trip said carrier member disengaging the same from said plate.

37. In a machine of the class described, a distributor plate, a carrier member engaging said distributor plate and adapted to receive and clamp there between articles whose classification has previously been determined, means for reciprocably operating said distributor plate and said carrier member, classified receptacles communicating with said plate and said carrier member for receiving said articles therefrom, keys labeled to correspond with each of said receptacles and arms communicating with each of said keys and provided with fingers adapted to trip said carrier member.

38. In a machine of the class described, a means for carrying and distributing articles whose classification has previously been determined, classified receptacles communicating with said means for receiving said articles, keys labeled to correspond with each of said receptacles, solenoids electrically communicating with said keys, dogs pivotally mounted at one end adapted to engage the cores of said solenoids, and arms adapted to be engaged by said dogs, and provided with fingers adapted to check the movements of said distributing means.

39. In a machine of the class described, a distributor plate, a carrier member engaging said distributor plate and adapted to receive and clamp there between articles whose classification has previously been determined, means for reciprocably operating said distributor plate and said carrier member, classified receptacles communicating with said plate and said carrier member for receiving said articles therefrom, keys labeled to correspond with each of said receptacles, solenoids electrically communicating with said keys, dogs pivotally mounted at one end adapted to engage the cores of said solenoids, and arms adapted to be engaged by said dogs, and provided with fingers adapted to check the movements of said distributing means.

40. In a machine of the class described, a means for carrying and distributing articles whose classification has previously been determined, channels communicating with said means for receiving said articles, keys corresponding with said channels, means communicating with said keys for checking the movements and operations of said distributing means, and said articles and other means communicating with said keys for discharging said articles from said channels and assisting the same on their path.

41. In a machine of the class described, a means for carrying and distributing articles whose classification has previously been determined, channels communicating with said means for receiving said articles, and conveyers communicating with said channels adapted to receive the articles deposited therein.

42. In a machine of the class described, a means for carrying and distributing articles whose classification has previously been determined, channels communicating with said means for receiving said articles, and conveyers communicating with said channels adapted to receive the articles deposited therein, guide members extending from said channels over said conveyers forming with said conveyers channels with moving bottoms.

43. In a machine of the class described, a means for carrying and distributing articles whose classification has previously been determined, channels communicating with said means for receiving said articles, and conveyers communicating with said channels adapted to receive the articles deposited therein, guide members substantially parallel with each other extending from said channels over and diagonally with the longitudinal axis of said conveyers forming with said conveyers channels with moving bottoms and terminating at the edges of said conveyers.

44. In a machine of the class described, a means for carrying and distributing articles whose classification has previously been determined, channels communicating with said means for receiving said articles, conveyers communicating with said channels adapted to receive the articles deposited therein, guide members substantially parallel with each other extending from said channels over and diagonally with the longitudinal axis of said conveyers forming with said conveyers channels with moving bottoms and terminating at the edges of said conveyers, and receptacles provided for and communicating with each of said channels.

45. In a machine of the class described, channels adapted to receive therein articles having been previously classified or sorted, conveyers communicating with said channels adapted to receive the articles deposited within said channels, and guide members extending from said channels over said conveyers forming with said conveyers channels with moving bottoms.

46. In a machine of the class described, channels adapted to receive therein articles having been previously classified or sorted, conveyers communicating with said channels adapted to receive the articles deposited within said channels, and guide members extending from said channels over and diagonally with the longitudinal axis of said conveyers forming with said conveyers channels with moving bottoms and terminating at the edges of said conveyers.

47. In a machine of the class described, channels adapted to receive therein articles having been previously classified or sorted, conveyers communicating with said channels, adapted to receive the articles deposited within said channels, guide members extending from said channels over and diagonally with the longitudinal axis of said conveyers forming with said conveyers channels with moving bottoms and terminating at the edges of said conveyers, and receptacles provided for and communicating with each of said channels.

48. In a machine of the class described, channels adapted to receive therein articles having been previously classified or sorted, conveyers communicating with said channels adapted to receive the articles deposited within said channels, guide members extending from said channels over said conveyers forming with said conveyers channels with moving bottoms, and chutes provided for and communicating with each of said channels.

49. In a machine of the class described, channels adapted to receive therein articles having been previously classified or sorted, conveyers communicating with said channels adapted to receive the articles deposited within said channels, guide members extending from said channels over said conveyers forming with said conveyers channels with moving bottoms, chutes provided for and communicating with each of said channels, and fingers adapted to deflect said articles into said chutes.

50. In a machine of the class described, channels adapted to receive therein articles having been previously classified or sorted, conveyers communicating with said channels adapted to receive the articles deposited within said channels, guide members extending from said channels over said conveyers forming with said conveyers channels with moving bottoms, chutes provided for and communicating with each of said channels, and receptacles provided and communicating with each of said chutes.

51. In a machine of the class described, channels adapted to receive therein articles having been previously classified or sorted, conveyers communicating with said channels adapted to receive the articles deposited therein, guides on said conveyers for deflecting said articles thereon and fingers and deflectors adapted to guide and deflect the course of the articles when discharged from said conveyers.

52. In a machine of the class described, channels adapted to receive therein articles having been previously classified or sorted, conveyers communicating with said channels adapted to receive the articles deposited therein, guides on said conveyers for deflecting said articles thereon and fingers and deflectors adapted to guide and deflect the course of the articles when discharged from said conveyers and open receptacles having their bottoms and sides slightly inclined.

53. In a machine of the class described, a displayer member, a means adapted to singly feed articles on to said displayer member for examination, a canceling means for marking said articles on said displayer member, and means for operating said canceling means.

54. In a machine of the class described, a supporting member, a means adapted to singly feed articles on to said supporting member for examination, a support, an arm pivotally mounted on said support, a canceling stamp secured to the free end of said arm adapted to mark said articles, and a means communicating with said feeding means for operating said arm.

55. In a machine of the class described, a supporting member adapted to receive articles thereon one at a time, a support, an arm pivotally mounted on said support, a canceling stamp secured to the free end of said arm adapted to intermittently engage said supporting member for marking said articles, and means for operating said arm.

56. In a machine of the class described, a supporting member adapted to receive articles thereon one at a time, a support, an arm pivotally mounted on said support, a canceling stamp secured to the free end of said arm adapted to intermittently engage said supporting member for marking said articles, a wheel revolubly mounted on said support adapted to positively engage said arm, and means for oscillatorally operating said wheel.

57. In a machine of the class described, a supporting member adapted to receive articles thereon one at a time, a support, an arm pivotally mounted on said support, a canceling stamp secured to the free end of said arm adapted to intermittently engage said supporting member for marking said articles, a wheel revolubly mounted on said support adapted to positively engage said arm, means for oscillatorally operating said wheel, a spiral spring secured to said support and said arm, a pawl pivotally mounted to said support adapted to engage said arm and retain the same in its raised or disengaged position, and means secured to said wheel for releasing said pawl.

In testimony whereof, we have hereunto set our hands at San Diego, California, this 29th day of March, 1922.

MARTIN S. RUNSVOLD.
HARRISON G. SLOANE.